US012809394B2

(12) United States Patent
Myung et al.

(10) Patent No.: US 12,809,394 B2
(45) Date of Patent: Nov. 24, 2026

(54) DRONE UNIT FOR UNMANNED EXPLORATION AND RECONNAISSANCE, AUTONOMOUS FLIGHT SYSTEM AND THE METHOD THEREOF

(71) Applicant: Korea Advanced Institute of Science and Technology, Daejeon (KR)

(72) Inventors: Hyun Myung, Daejeon (KR); Seungwon Song, Daejeon (KR); I Made Aswin Nahrendra, Daejeon (KR); Junho Choi, Daejeon (KR); Duckyu Choi, Daejeon (KR); Seunghyun Lee, Daejeon (KR); Eungchang Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 194 days.

(21) Appl. No.: 18/783,703

(22) Filed: Jul. 25, 2024

(65) Prior Publication Data

US 2025/0036138 A1 Jan. 30, 2025

(30) Foreign Application Priority Data

Jul. 28, 2023 (KR) ........................ 10-2023-0099161
Oct. 26, 2023 (KR) ........................ 10-2023-0144324

(51) Int. Cl.
*G05D 1/622* (2024.01)
*B64U 30/299* (2023.01)
(Continued)

(52) U.S. Cl.
CPC ........... *G05D 1/622* (2024.01); *B64U 30/299* (2023.01); *G05D 1/242* (2024.01); *G05D 1/2435* (2024.01);
(Continued)

(58) Field of Classification Search
CPC ........ B64U 30/299; G06V 20/17; G06T 7/70; G05D 1/622; G05D 1/242; G05D 1/2435; G05D 1/245; G05D 1/2465
See application file for complete search history.

(56) References Cited

U.S. PATENT DOCUMENTS

2017/0301111 A1* 10/2017 Zhao ...................... H04N 23/90
2019/0026531 A1* 1/2019 Alvarez Gonzalez ....................... G06F 18/23213
(Continued)

*Primary Examiner* — Luke Huynh
(74) *Attorney, Agent, or Firm* — J. Robin Rohlicek

(57) ABSTRACT

Provided is an autonomous flight system of a drone unit including an information acquisition unit configured to acquire first information through a camera mounted to the drone unit, acquire second information through LiDAR, and acquire third information through an inertial measurement unit (IMU); an information processing unit configured to estimate a pose of the drone unit through the second information and the third information, acquire a coordinate value of a target object through the first information and the second information, and construct a 3D map and an unknown area exploration algorithm based on a pose estimation value of the drone unit, the coordinate value of the target object, and the second information; a path planner configured to generate an obstacle avoidance path based on the 3D map and the unknown area exploration algorithm; and a flight controller configured to apply the obstacle avoidance path to the drone unit.

22 Claims, 7 Drawing Sheets

(51) Int. Cl.

| | |
|---|---|
| ***G05D 1/242*** | (2024.01) |
| ***G05D 1/243*** | (2024.01) |
| ***G05D 1/245*** | (2024.01) |
| ***G05D 1/246*** | (2024.01) |
| ***G06T 7/70*** | (2017.01) |
| ***G06V 20/17*** | (2022.01) |
| *B64U 101/30* | (2023.01) |
| *G05D 105/80* | (2024.01) |
| *G05D 109/25* | (2024.01) |

(52) U.S. Cl.

CPC ........... *G05D 1/245* (2024.01); *G05D 1/2465* (2024.01); *G06T 7/70* (2017.01); *G06V 20/17* (2022.01); *B64U 2101/30* (2023.01); *B64U 2201/10* (2023.01); *G05D 2105/87* (2024.01); *G05D 2109/254* (2024.01); *G06T 2207/10032* (2013.01); *G06V 2201/07* (2022.01)

(56) References Cited

U.S. PATENT DOCUMENTS

2019/0064851 A1* 2/2019 Tran ..................... G05D 1/0816
2019/0377345 A1* 12/2019 Bachrach ............. G05D 1/0094

* cited by examiner

DRONE UNIT FOR UNMANNED EXPLORATION AND RECONNAISSANCE, AUTONOMOUS FLIGHT SYSTEM AND THE METHOD THEREOF

CROSS-REFERENCE TO RELATED APPLICATION(S)

This application claims the priority benefit of Korean Patent Applications No. 10-2023-0099161, filed on Jul. 28, 2023, and No. 10-2023-0144324, filed on Oct. 26, 2023, in the Korean Intellectual Property Office, the disclosure of which is incorporated herein by reference.

BACKGROUND

1. Field of the Invention

Example embodiments relate to a drone unit for unmanned exploration and reconnaissance and an autonomous flight system of a drone unit and a method thereof, and more particularly, to an autonomous flying drone unit for unmanned exploration and reconnaissance and an autonomous flight framework including pose estimation, object recognition, path generation, and unknown area exploration.

2. Description of the Related Art

In general, a drone unit has a flight function and is applied to various fields. Among such various fields, the drone unit stands out in the field of surveillance, such as acquiring a variety of information by exploring and reconnoitering unknown environments that are difficult for humans to access. However, in order for the drone unit to autonomously fly and perform an exploration or reconnaissance mission in an unknown environment, the drone unit needs to have hardware that is robust against collisions and to meet all conditions, such as a light weight, a small size, and a long flight time.

Also, in order for a drone to autonomously fly and perform an exploration or reconnaissance mission in an unknown environment, there is a need for development of an autonomous flight framework that accurately estimates a pose in real time, corrects a pose estimation error, plan a path of safely avoiding obstacles, and has an efficient unknown area exploration algorithm.

SUMMARY

An objective of an example embodiment is to provide a platform of a drone unit in a new shape that considers a thrust efficiency, a weight, a size, and robustness against collisions.

An objective of an example embodiment is to provide an algorithm that allows a drone unit to return to a starting point stably by estimating a pose in real time, by correcting a pose estimation error, and by modifying coordinates of a target point, a path planning algorithm that safely avoids obstacles in a narrow area, an algorithm that acquires accurate coordinates of a target through sensor fusion, and an unknown area exploration algorithm using a local horizon.

However, the technical subjects to be solved by the present invention are not limited to the aforementioned subjects and may variously expand without departing from the technical spirit and scope of the present invention.

According to an example embodiment, there is provided an autonomous flight system of a drone unit for unmanned exploration and reconnaissance, the autonomous flight system including an information acquisition unit configured to acquire first information through a camera mounted to the drone unit, to acquire second information through light detection and ranging (LiDAR), and to acquire third information through an inertial measurement unit (IMU); an information processing unit configured to estimate a pose of the drone unit through the second information and the third information, to acquire a coordinate value of a target object through the first information and the second information, and to construct a three-dimensional (3D) map and an unknown area exploration algorithm based on a pose estimation value of the drone unit, the coordinate value of the target object, and the second information; a path planner configured to plan an obstacle avoidance path based on the 3D map and the unknown area exploration algorithm; and a flight controller configured to apply the obstacle avoidance path to the drone unit.

According to an example embodiment, there is provided a drone unit for unmanned exploration and reconnaissance, the drone unit including a camera configured to acquire first information; LiDAR configured to acquire second information; an IMU configured to acquire third information; a memory configured to store at least one instruction; and a controller configured to execute the at least one instruction and to control a flight movement according to an obstacle avoidance path based on a 3D map generated through the first information, the second information, and the third information and an unknown area exploration algorithm.

Also, the drone unit may include a drone frame; a body provided at the center of the drone frame and equipped with the camera, the LiDAR and the IMU, the memory and the controller; a combined propeller guard connected to the drone frame and representing a square shape based on the body; a propeller attached downward to each of four arms of the drone frame and configured to generate thrust for flight; and a landing gear provided at a lower end of each of four corners of the drone frame and configured to couple to the combined propeller guard.

According to an example embodiment, there is provided an autonomous flight method by an autonomous flight system of a drone unit for unmanned exploration and reconnaissance, the autonomous flight method including acquiring first information through a camera mounted to the drone unit, acquiring second information through LiDAR, and acquiring third information through an IMU; estimating a pose of the drone unit through the second information and the third information, acquiring a coordinate value of a target object through the first information and the second information, and constructing a 3D map and an unknown area exploration algorithm based on a pose estimation value of the drone unit, the coordinate value of the target object, and the second information; planning an obstacle avoidance path based on the 3D map and the unknown area exploration algorithm; and applying the obstacle avoidance path to the drone unit.

According to example embodiments, in an unknown environment, a drone unit may perform an exploration or reconnaissance mission of autonomously flying, acquiring a precise 3D map including coordinates of a target, and then safely returning to a starting point.

According to example embodiments, by using a combined propeller guard using an elastic material for a drone unit, it is possible to minimize a weight and an area that blocks the air flow and to maintain a stable flight by elastically absorbing shock coming from an inevitable collision.

According to example embodiments, since a drone unit has a structure in which a landing gear is coupled to a drone frame and a combined propeller guard is coupled to the landing gear and a propeller is attached downward to each of four arms of the drone frame, it is possible to minimize an area in which the landing gear occludes the propeller and to maximize a thrust efficiency and a flight time.

However, the effects of the present invention are not limited to the aforementioned effects and may variously expand without departing from the technical spirit and scope of the present invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
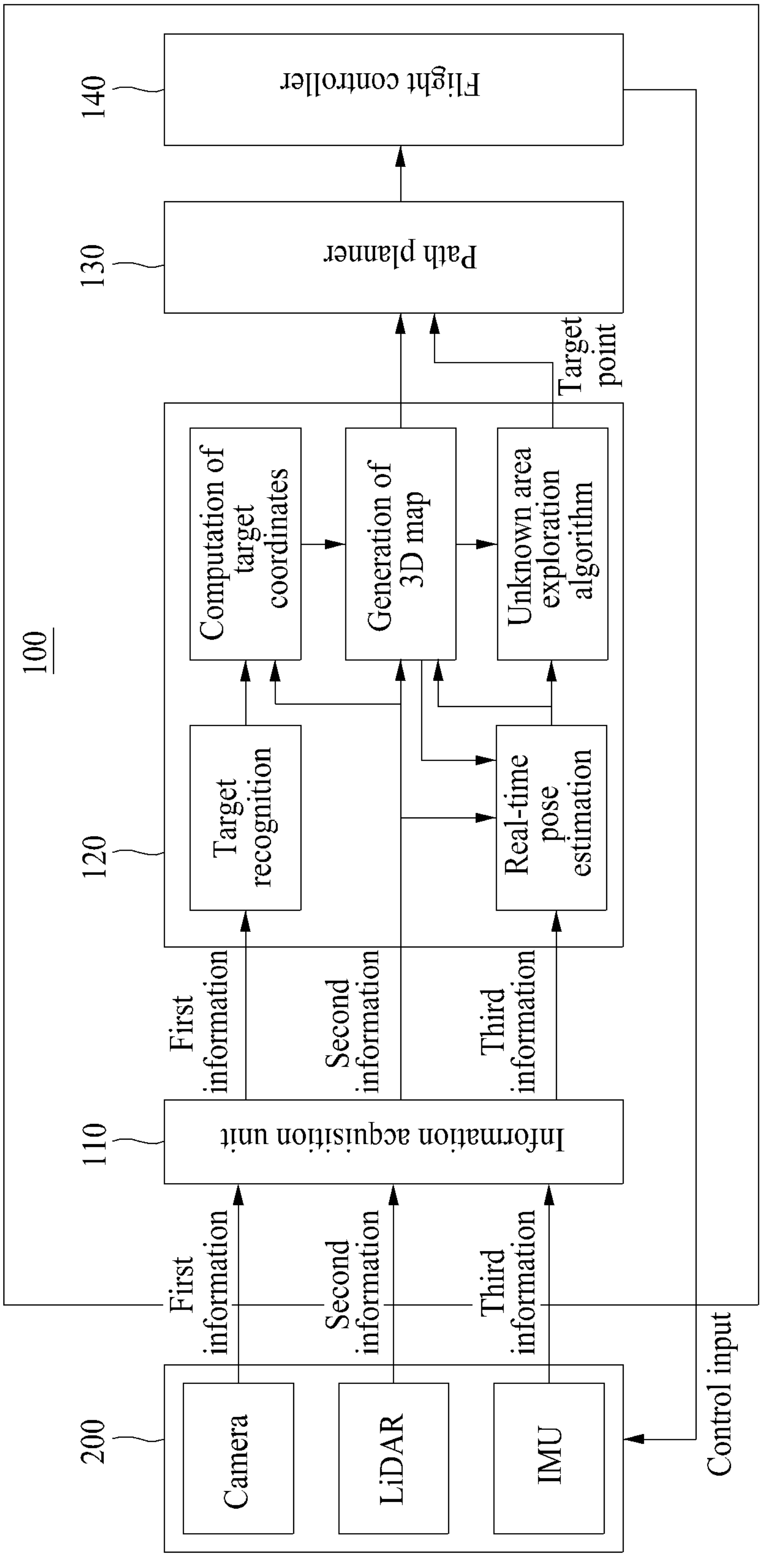
FIG. 1 is a block diagram illustrating a configuration of an autonomous flight system of a drone unit according to an example embodiment.

Advantages and features of the present invention and methods to achieve the same will become clear with reference to example embodiments described in detail along with the accompanying drawings. However, the present invention is not limited to example embodiments disclosed blow and may be implemented in various forms. Here, the example embodiments are provided to make the disclosure of the present invention complete and to fully inform one of ordinary skill in the art to which the present invention pertains of the scope of the present invention and the present invention is defined by the scope of the claims.

The terms used herein are to explain the example embodiments and not to be limiting of the present invention. Herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. Like reference numerals refer to like components and a repeated description related thereto will be omitted.

The example embodiments provide an autonomous flying drone unit for unmanned exploration and reconnaissance and an autonomous flight framework that includes pose estimation, object recognition, path planning, and unknown area exploration.

The example embodiments employ a method of correcting a pose estimation error of a drone unit and multiplying the pose estimation error by coordinates of a moving target point, instead of using a loop-closing method to prevent a sudden change in a location.

Also, the example embodiments plan a path of avoiding obstacles and collisions through two stages using ray-casting and acquire accurate coordinates of a target through sensor fusion of light detection and ranging (LiDAR) and a camera and a precise three-dimensional (3D) map including the same.

Hereinafter, the example embodiments are described in detail with reference to FIGS. 1 to 7.

Figure 6:
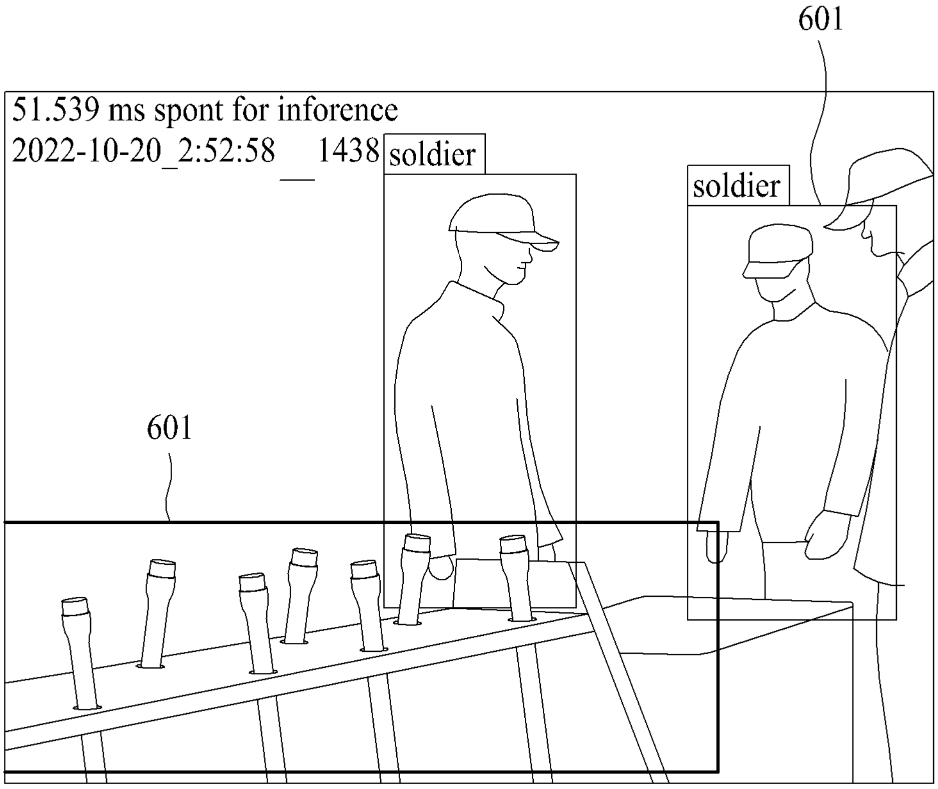
FIG. 6 illustrates resulting images by an algorithm that acquires coordinates of a target or coordinates of a mark according to an example embodiment.

FIG. 1 is a block diagram illustrating a configuration of an autonomous flight system of a drone unit according to an example embodiment. Also, FIG. 6 illustrates resulting images by an algorithm that acquires coordinates of a target or coordinates of a mark according to an example embodiment.

An autonomous flight system of a drone unit according to an example embodiment shown in FIG. 1 provides an autonomous flying drone unit for unmanned exploration and reconnaissance and an autonomous flight framework that includes pose estimation, object recognition, path planning, and unknown area exploration.

To this end, an autonomous flight system 100 of a drone unit 200 according to an example embodiment includes an information acquisition unit 110, an information processing unit 120, a path planner 130, and a flight controller 140.

The drone unit 200 according to an example embodiment may include a camera, light detection and ranging (LiDAR), and an inertial measurement unit (IMU). Therefore, the information acquisition unit 110 acquires first information through the camera mounted to the drone unit 200, acquires second information through the LiDAR, and acquires third information through the IMU. The information acquisition unit 110 may acquire the first information related to target object recognition through the camera, may acquire the second information for pose estimation of the drone unit 200 and map generation through the LiDAR, and may acquire the third information related to real-time angular velocity and acceleration information of the drone unit 200 through the IMU.

Here, the camera may capture a video using a complementary metal-oxide semiconductor (CMOS), a charge coupled device (CCD) image sensor, and the like, and may acquire video data and visual odometry data of an unmanned object.

The LiDAR may refer to a radar system that emits a laser pulse to a reflector (or target object), measures an amount of time used for the laser pulse reflected and returned from the reflector, and may measure location coordinates of the reflector. As already known, the LiDAR may store location coordinates measured and computed from reflection intensity as measurement data and the measurement data may be used as basic information to image a 3D graph structure. Here, the LiDAR is already widely used in the art and thus, description related to the main operating principle thereof is omitted.

The IMU measures an angular velocity, that is, a rotation speed using a gyro sensor (gyroscope) and measures (acceleration=linear acceleration+gravitational acceleration), that is, a combined value of a pure acceleration value of an actual drone unit and posture information on a tilt with respect to the direction of gravity using an accelerometer. For example, the IMU may generate posture-related sensor data, such as a median angular velocity value in each of a forward direction (roll-axis direction), a right direction of the forward direction (pitch-axis direction), the direction of gravity (yaw-axis direction) as a rotation angle of an unmanned object, and may generate acceleration-related sensor data, such as a median speed value of the unmanned object, using the acceleration sensor. The acceleration sensor is an acceleration-related sensor that measures values including a median speed value of the unmanned object and gravitational acceleration.

The information processing unit 120 processes a pose estimation algorithm, a coordinate acquisition algorithm, and an unknown area exploration algorithm using the first information, the second information, and the third information acquired from the camera, the LiDAR, and the IMU of the drone unit 200, respectively. In more detail, the information processing unit 120 estimates a pose of the drone unit 200 through the second information and the third information, acquires a coordinate value of a target object (or mark) through the first information and the second information, and constructs a 3D map and an unknown area exploration algorithm based on a pose estimation value of the drone unit 200, the coordinate value of the target object, and the second information. The information processing unit 120 generates an obstacle map using the second information and a pose of a drone scanned by the LiDAR and generates the 3D map by including the coordinate value of the target object in the obstacle map.

The information processing unit 120 processes the coordinate acquisition algorithm that acquires precise coordinates of a target (target object or mark) through sensor fusion. In more detail, the information processing unit 120 may acquire the coordinate value of the target object by recognizing the mark (or target object) that is the target through the first information and by computing coordinates of the target object from the first information and the second information. Describing with reference to FIG. 6, the information processing unit 120 may detect a mark 601 and acquire two-dimensional (2D) coordinates of the mark 601 using YOLOv4 artificial intelligence learning network accelerated with TensorRT and may acquire 3D coordinates of a corresponding mark. The information processing unit 120 may compute accurate 3D mark coordinates by matching distance information of the LiDAR and the 2D coordinates of the mark, and may manage outlier filter, clustering, covariance filter processing, and center coordinates of the mark as voxels. Also, the information processing unit 120 may represent each mark using a marker in different color on the 3D map depending on a type of a corresponding mark. The marker may be expressed as a model, such as a sphere or a square, and may be expressed in 2D or 3D. Also, a corresponding mark may be expressed using a different marker or a different color depending on a type of the mark.

The information processing unit 120 processes the pose estimation algorithm that allows the drone unit 200 to safely return to a starting point by estimating a pose in real time, by correcting a pose estimation error, and by modifying a target point. In more detail, the information processing unit 120 may modify the target point of the drone unit 200 by estimating the pose of the drone unit 200 using the second information, the third information, and the 3D map and by correcting the pose estimation error. The information processing unit 120 may estimate a real-time pose of the drone unit 200 from the second information, the third information, and the 3D map using Fast-LIO2 algorithm. Here, the autonomous flight system 100 of the drone unit 200 according to an example embodiment may store a surrounding map just before the drone unit 200 enters an interior such as a building, and may process an algorithm such that the drone unit 200 may accurately arrive at the starting point, by matching data scanned with the LiDAR and the surrounding map immediately after leaving and computing a drift (i.e., error of accumulated pose estimation), and by multiplying the inverse of the drift by coordinates of the target point.

Therefore, unlike a loop-closing method of storing and matching all keyframes, the information processing unit 120 may prevent a phenomenon that a computational amount grows linearly and a pose estimation value is unstable, for example, a phenomenon that, in the case of a drone, if the pose estimation is unstable (suddenly bounces), the flight becomes unstable.

The information processing unit 120 processes the unknown area exploration algorithm using a local horizon. In more detail, the information processing unit 120 may generate the 3D map using the coordinate value of the target object, the second information, and the pose estimation value of the drone unit 200, may estimate a real-time pose of the drone unit 200 from the 3D map, the second information, and the third information, and may process the unknown area exploration algorithm with the corresponding pose estimation value. Here, the information processing unit 120 may maximize an exploration efficiency by processing the unknown area exploration algorithm that repeats a process of detecting a frontier area using an occupancy grid map, and selecting, as an optimal frontier, a frontier furthest and having a largest cluster among frontier areas in a local horizon area and moving thereto. The frontier area represents a free area adjacent to an unknown area and may represent, for example, a door.

A gain function of frontier is expressed as [Equation 1] as below.

$$\mathbb{G}(x) = S(x)\|x - o\| \quad \text{[Equation 1]}$$

Here, x denotes center coordinates of the frontier, o denotes current coordinates of a drone unit, S(x) denotes a size of a frontier cluster, and $\mathbb{G}$ (x) denotes gain of the frontier.

The existing frontier-based exploration method involves a lot of unnecessary movement by simply repeating moving to a closest frontier in the entire map, but the autonomous flight system 100 according to an example embodiment may maximize the exploration efficiency by processing the unknown area exploration algorithm that repeats the process of selecting the frontier area furthest and having the largest cluster size as the optimal frontier from among frontier areas in the local horizon area and moving thereto.

In FIG. 1, the path planner 130 plans an obstacle avoidance path based on the 3D map and the unknown area exploration algorithm. The path planner 130 may generate a path using a path planning algorithm of safely avoiding obstacles in a narrow area through two stages. In more detail, the path planner 130 may generate the obstacle avoidance path using the path planning algorithm of searching for a sampling-based shortest distance based on the 3D map and the unknown area exploration algorithm and modifying a path to avoid obstacles in the narrow area.

As a first stage, the path planner 130 may search for the sampling-based shortest distance using an Informed-RRT # method. Here, an Informed method represents a method of generating an initial path and then adjusting a sampling area to achieve faster convergence to an optimal value, and an RRT # method represents a method of rewiring all edges of which cost is improved while continuously maintaining a pseudo-optimal tree and speeding up convergence. Therefore, the path planner 130 searches for a primary shortest distance using the Informed-RRT # method in which the aforementioned two methods are combined. In the first stage, collisions with obstacles are considered, but only a minimum safe radius is considered and the shortest distance is prioritized, so a path is generated by adhering to obstacles or walls.

As a second stage, the path planner 130 may modify a path to a safe path. The path planner 130 detects a distance from an obstacle in all directions by performing omnidirectional ray-casting at points on the path from results of the Informed-RRT # method and changes the path to the midpoint within a safe area. Therefore, the drone unit 200 may pass through a door with a narrow width of about 70 cm.

Referring to FIG. 1, the flight controller 140 applies the obstacle avoidance path to the drone unit 200. The flight controller 140 may control flight movement of the drone unit 200 according to the obstacle avoidance path generated by the path planner 130.

Figure 2:
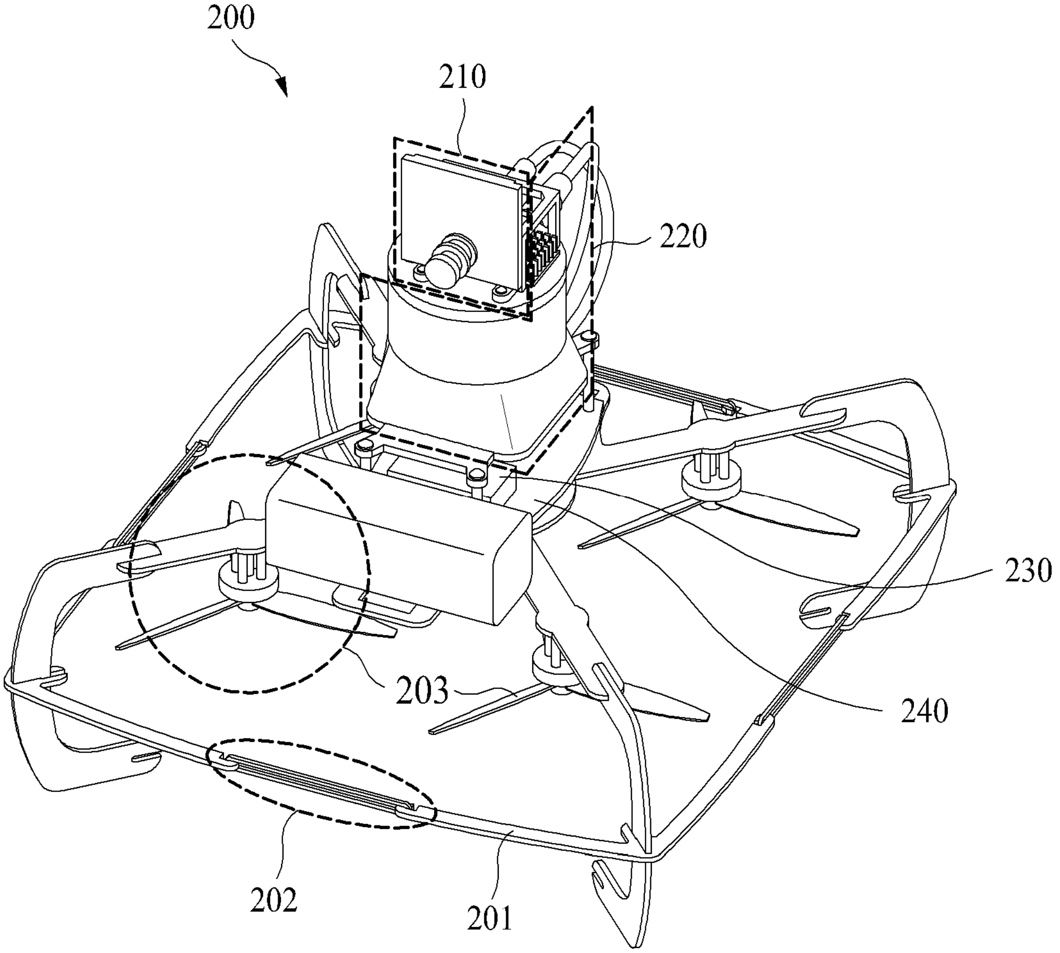
FIG. 2 illustrates a perspective view of a drone unit according to an example embodiment.
Figure 3:
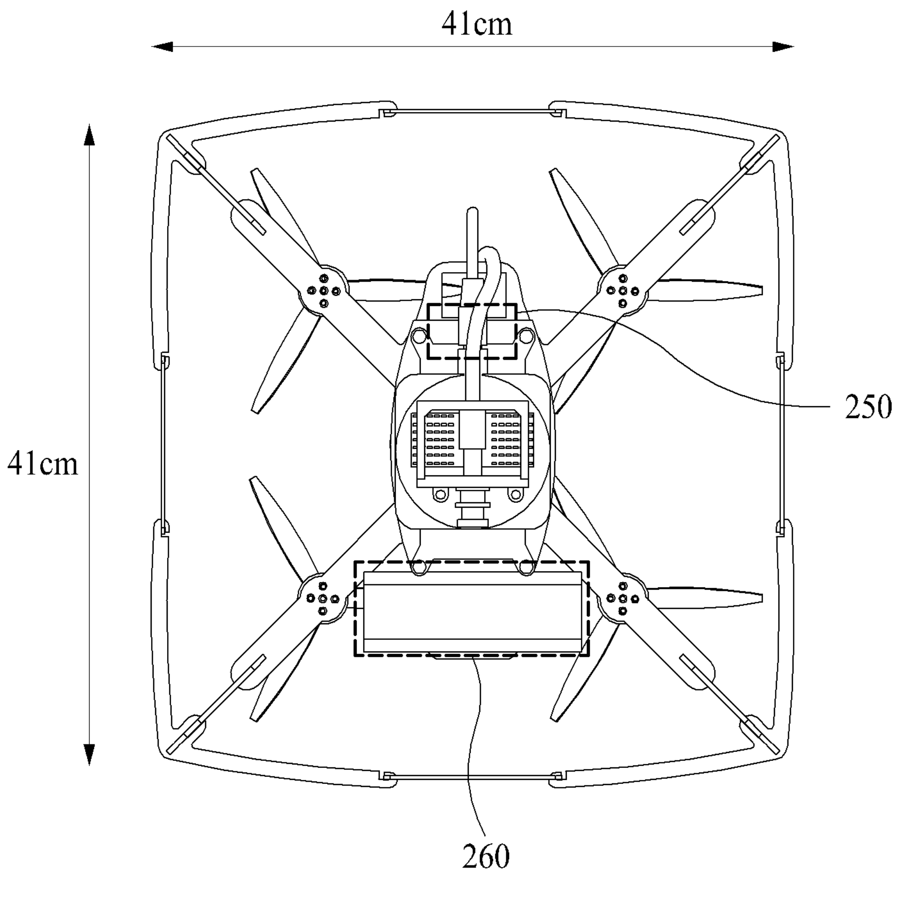
FIG. 3 illustrates a top view of a drone unit according to an example embodiment.
Figure 4:
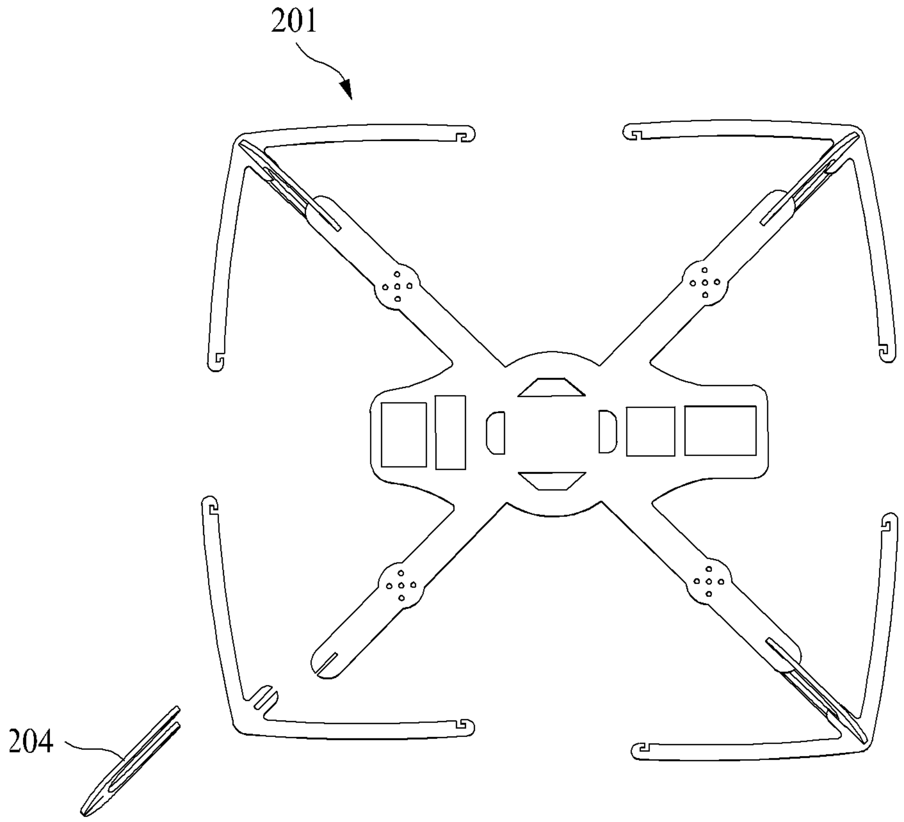
FIG. 4 illustrates a top view of a drone frame, a combined propeller guard, and a landing gear according to an example embodiment.
Figure 5A:
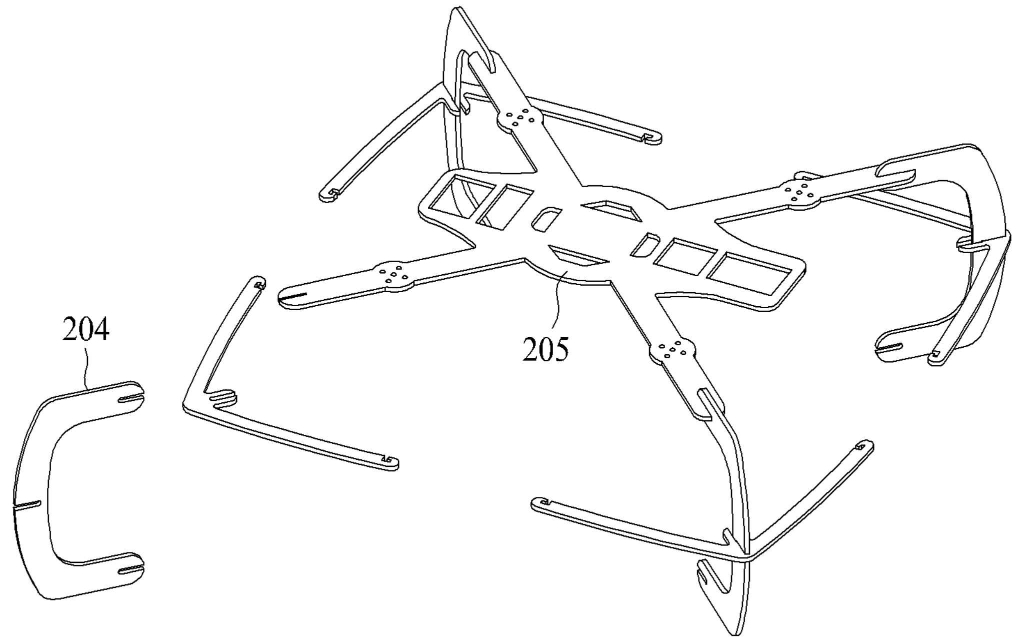
FIGS. 5A to 5C illustrate a process of sequentially coupling a combined propeller guard and a landing gear to a drone frame according to an example embodiment.
Figure 5B:
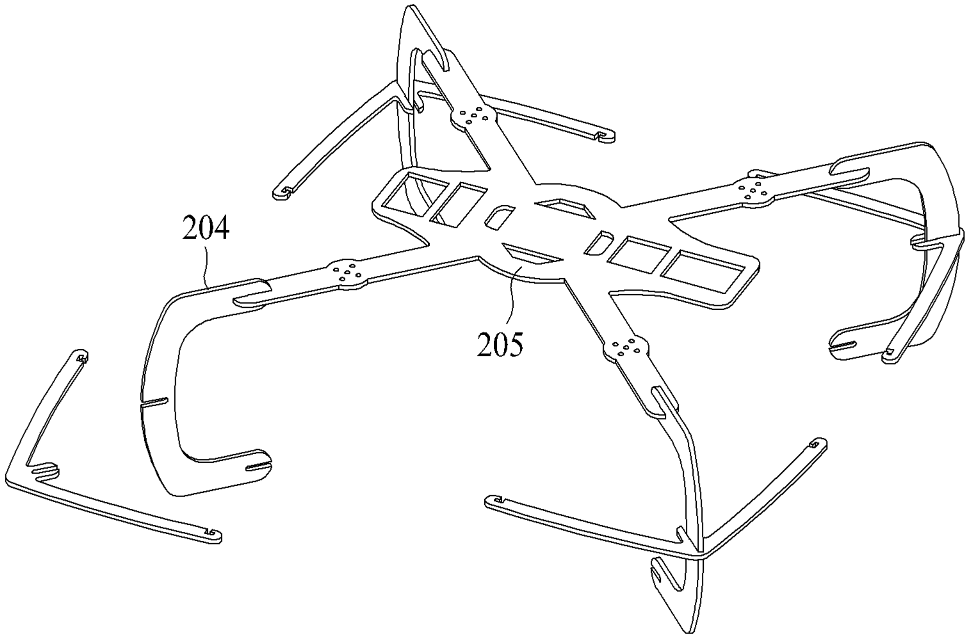
Figure 5C:
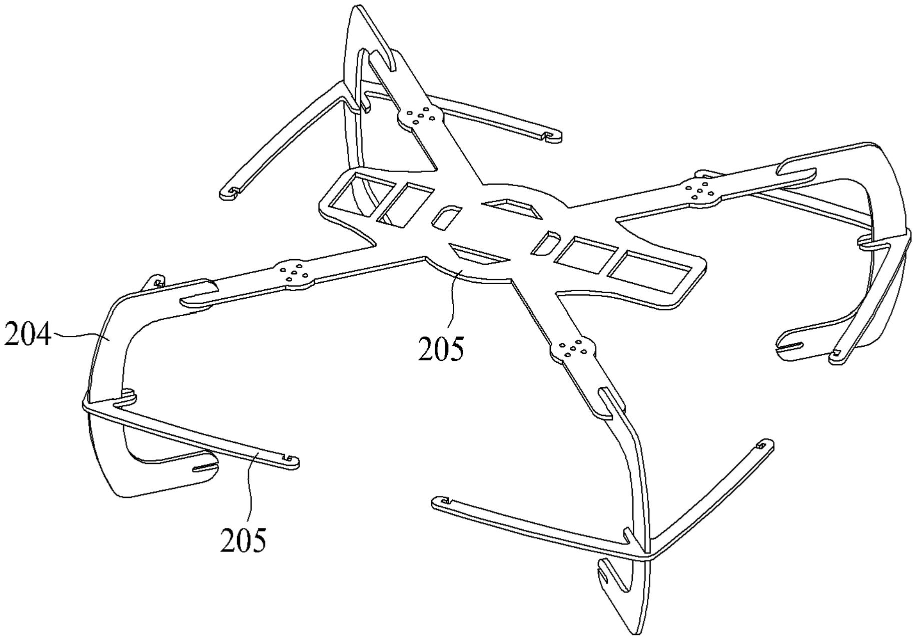

FIG. 2 illustrates a perspective view of a drone unit according to an example embodiment, FIG. 3 illustrates a top view of a drone unit according to an example embodiment, FIG. 4 illustrates a top view of a drone frame, a combined propeller guard, and a landing gear according to an example embodiment, and FIGS. 5A to 5C illustrate a process of sequentially coupling a combined propeller guard and a landing gear to a drone frame according to an example embodiment.

The drone unit 200 according to an example embodiment represents a new shape that considers a thrust efficiency, a weight, a size, and robustness against a collision.

Referring to FIGS. 2 to 5C, the drone unit 200 has a basic structure with a total area including a drone frame 205, a combined propeller guard 201, and a landing gear 204, and a body is provided to the drone frame 205 that is the center of the combined propeller guard 201. Here, the drone frame 205 represents an area excluding the combined propeller guard 201 and the landing gear 204 from the entire black carbon area shown in FIGS. 5A to 5C, and the body is attached and fixed to the drone frame 205. Here, the combined propeller guards 201 and the landing gears 204 coupled to the drone frame 205 of the drone unit 200 represent a square shape based on the body, with the width, the length, and the height of about 41×41×24.5 cm. The drone unit 200 was manufactured in consideration that the width of a narrowest door in a general indoor environment is 70 cm and may pass through even the narrowest door.

The body of the drone unit 200 includes an ultra-small camera 210, 3D LiDAR 220, a flight control device (or control unit) 230, an onboard PC for drone 240, 6Cell LiPo 1300 mAh for PC 250, and 6Cell LiPo battery 5200 mAh for motor 260. Although not illustrated in FIGS. 2 and 3, the body of the drone unit 200 includes an IMU (not shown) and may also include a memory configured to store instructions.

The camera 210 is an ultra-small global shutter camera configured to acquire first information for accurate mark detection, the 3D LiDAR 220 acquires second information for precise pose estimation and obstacle detection, and the IMU (not shown) acquires third information. Also, the flight control device 230 executes at least one instruction to control flight movement along an obstacle avoidance path based on a 3D map generated based on the first information, the second information, and the third information and an unknown area exploration algorithm. The drone unit 200 may fly according to an instruction from algorithm processing by the autonomous flight system 100 of the drone unit 200 according to an example embodiment. Here, the drone unit 200 weighs 2.317 kg, including two batteries, the 6Cell LiPo battery 1300 mAh for PC 250 and the 6Cell LiPo battery 5200 mAh for motor 260 and has a maximum flight time of about 12 minutes.

The combined propeller guard 201 of the drone unit 200 represents a square shape centered on the body and may absorb shock of the drone unit 200 by combining an elastic material 202 at the center of each of four sides of the square shape. The combined propeller guard 201 using the elastic material 202 may minimize a weight and an area that blocks the air flow and may enable the stable flight of the drone unit 200 by elastically absorbing the shock from an inevitable collision.

Also, the drone unit 200 has a structure in which the landing gear 204 is coupled to the drone frame 205 and the combined propeller guard 201 is coupled to the landing gear 204, and includes four propellers 203 respectively attached downward to four arms of the drone frame 205 for a long flight time and maximizes thrust efficiency for flight. The drone unit 200 may maximize the thrust efficiency and the flight time by including the propeller 203 attached downward and by minimizing an area in which the landing gear 204 occludes the propeller 203.

Referring to FIG. 4, the drone frame 205 of the drone unit 200 has the landing gear 204 coupled at a lower end of each corner and the combined propeller guard 201 is coupled to the landing gear 204. Referring to FIGS. 5A and 5B, the landing gear 204 is coupled at the lower end of each of the four corners of the drone frame 205. Then, referring to FIG. 5C, the combined propeller guard 201 is coupled in a cross shape near the middle of the landing gear 204 coupled to the drone frame 205. Accordingly, the landing gear 204 is provided at the lower end of each corner of the combined propeller guard 201 and allows a center portion of the combined propeller guard 201 to be separated from the ground by a predetermined distance or more. In this manner, an area of occluding the propeller 203 attached downward to each of four arms of the drone frame 205 may be minimized to maximize the thrust efficiency and the flight time of the drone unit 200.

The drone unit according to an example embodiment generated a precise 3D map and performed and verified a mission of returning to the origin by conducting unmanned reconnaissance and exploration in an environment simulating a battlefield situation with complex of obstacles and buildings of about 50×30×7 $m^3$. In a verification environment, the drone unit according to an example embodiment conducted unmanned reconnaissance and exploration of all courses through fully autonomous flight without a collision in the environment and generated the precise 3D map and completed the mission of returning to the origin.

Figure 7:
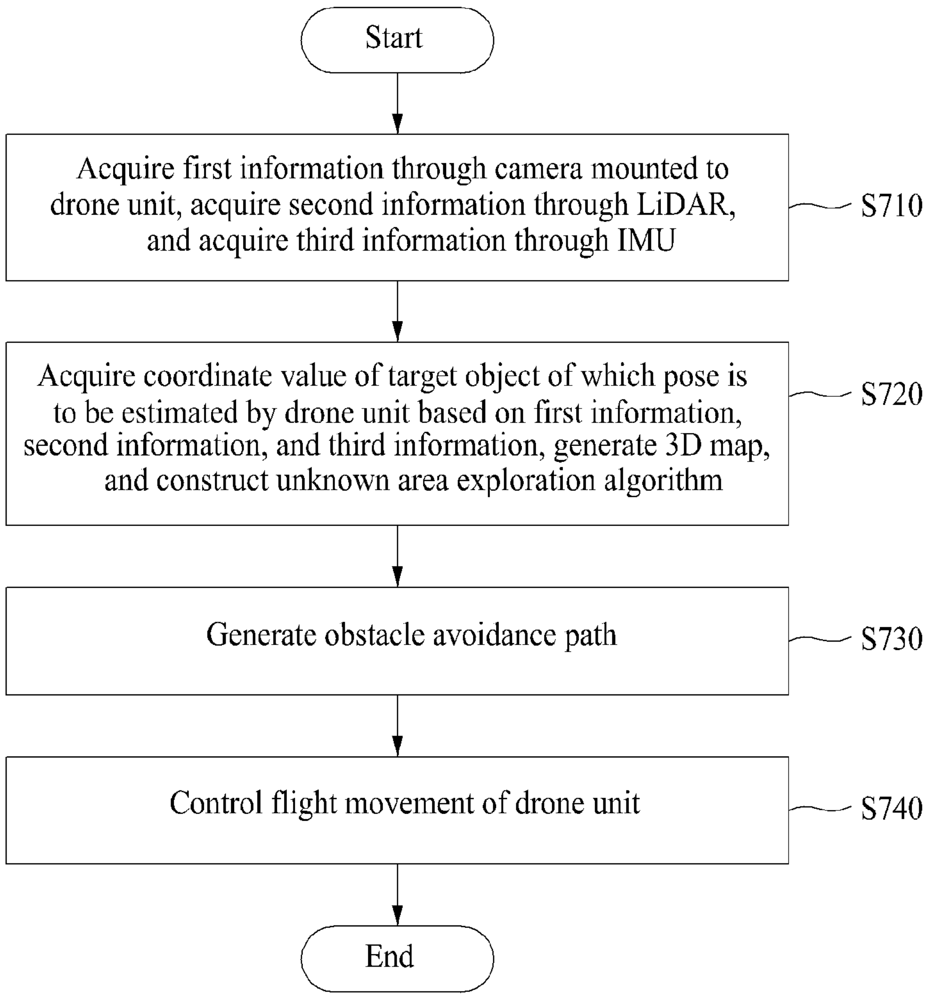
FIG. 7 is a flowchart illustrating an autonomous flight method of a drone unit according to an example embodiment.

FIG. 7 is a flowchart illustrating an autonomous flight method of a drone unit according to an example embodiment.

The autonomous flight method of the drone unit according to an example embodiment shown in FIG. 7 is performed by the autonomous flight system of the drone unit according to an example embodiment shown in FIG. 1.

Referring to FIG. 7, operation S710 acquires first information through a camera mounted to the drone unit, acquires second information through LiDAR, and acquires third information through an IMU. Operation S710 may acquire the first information related to target object recognition through the camera, may acquire the second information for pose estimation of the drone unit and map generation through the LiDAR, and may acquire the third information related to real-time angular velocity and acceleration information of the drone unit through the IMU.

Operation S720 processes a pose estimation algorithm, a coordinate acquisition algorithm, and an unknown area exploration algorithm using the first information, the second information, and the third information acquired from the camera, the LiDAR, and the IMU of the drone unit 200, respectively. In more detail, operation S720 estimates a pose of the drone unit through the second information and the third information, acquires a coordinate value of a target object (or mark) through the first information and the second information, and constructs a 3D map and an unknown area exploration algorithm based on a pose estimation value of the drone unit, the coordinate value of the target object, and the second information. Operation S720 generates an obstacle map using the second information and a pose value of a drone scanned by the LiDAR and generates the 3D map by including the coordinate value of the target object in the obstacle map.

Operation S720 processes the coordinate acquisition algorithm that acquires precise coordinates of a target (target object or mark) through sensor fusion. In more detail, operation S720 may acquire the coordinate value of the target object by recognizing the mark (or target object) that is the target through the first information and by computing coordinates of the target object from the first information and the second information. Operation S720 may detect a mark using YOLOv4 artificial intelligence learning network accelerated with TensorRT and may acquire 2D coordinates. Operation S720 may compute accurate 3D mark coordinates by matching distance information of the LiDAR and the 2D coordinates and may manage outlier filter, clustering, covariance filter processing, and center coordinates of the mark as voxels. Also, operation S720 may represent each mark using a marker in different color on the 3D map depending on a type of a corresponding mark. The marker may be expressed as a model, such as a sphere or a square, and may be expressed in 2D or 3D. Also, a corresponding mark may be expressed using a different marker or a different color depending on a type of the mark.

Operation S720 processes the pose estimation algorithm that allows the drone unit to safely return to a starting point by estimating a pose in real time, by correcting a pose estimation error, and by modifying a target point. In more detail, operation S720 may modify the target point of the drone unit by estimating the pose of the drone unit using the second information, the third information, and the 3D map and by correcting the pose estimation error. Operation S720 may estimate a real-time pose of the drone unit from the second information, the third information, and the 3D map using Fast-LIO2 algorithm. Here, the autonomous flight method of the drone unit according to an example embodiment may store a surrounding map just before the drone unit enters an interior such as a building, and operation S720 may process an algorithm such that the drone unit may accurately arrive at the starting point, by matching data scanned with the LiDAR and the surrounding map immediately after leaving and computing a drift (i.e., error of accumulated location estimation), and by multiplying the inverse of the drift by coordinates of the target point.

Operation S720 processes the unknown area exploration algorithm using a local horizon. In more detail, operation S720 may generate the 3D map using the coordinate value of the target object, the second information, and the pose estimation value of the drone unit, may estimate a real-time pose of the drone unit from the 3D map, the second information, and the third information, and may process the unknown area exploration algorithm with the corresponding pose estimation value. Here, operation S720 may maximize an exploration efficiency by processing the unknown area exploration algorithm that repeats a process of detecting a frontier area using an occupancy grid map, and selecting, as an optimal frontier, a frontier area furthest and having a largest cluster among frontier areas in a local horizon area and moving thereto. The frontier area represents a free area adjacent to an unknown area and may represent, for example, a door.

Operation S730 generates an obstacle avoidance path based on the 3D map and the unknown area exploration algorithm. Operation S730 may generate a path using a path planning algorithm of safely avoiding obstacles in a narrow area through two stages. In more detail, operation S730 may generate the obstacle avoidance path using the path planning algorithm of searching for a sampling-based shortest distance based on the 3D map and the unknown area exploration algorithm and modifying a path to avoid obstacles in the narrow area.

As a first stage, operation S730 may search for the sampling-based shortest distance using an Informed-RRT # method. Here, an Informed method represents a method of generating an initial path and then adjusting a sampling area to achieve faster convergence to an optimal value, and an RRT # method represents a method of rewiring all edges of which cost is improved while continuously maintaining a pseudo-optimal tree and speeding up convergence. Therefore, operation S730 searches for a primary shortest distance using the Informed-RRT # method in which the aforementioned two methods are combined. In the first stage, collisions with obstacles are considered, but only a minimum safe radius is considered and the shortest distance is prioritized, so a path is generated by adhering to obstacles or walls.

As a second stage, operation S730 may modify a path to a safe path. Operation S730 detects a distance from an obstacle in all directions by performing omnidirectional ray-casting at points on the path from results of the Informed-RRT # method and changes the path to the midpoint within a safe area.

Operation S740 applies the obstacle avoidance path to the drone unit. Operation S740 may control flight movement of the drone unit according to the obstacle avoidance path generated by S730.

The systems or the apparatuses described herein may be implemented using hardware components, software components, and/or combination of the hardware components and the software components. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or at least one combination thereof, for independently or collectively instructing or configuring the processing device to operate as desired. Software and/or data may be permanently or temporarily embodied in any type of machine, component, physical equipment, virtual equipment, computer storage medium or device, or a signal wave to be transmitted, to provide instructions or data to the processing device or be interpreted by the processing device. The software also may be distributed over network coupled computer systems so that the software is stored and executed in a distributed fashion. The software and data may be stored in one or more computer readable storage mediums.

The methods according to example embodiments may be implemented in a form of a program instruction executable through various computer methods and recorded in non-transitory computer-readable media. The media may include, alone or in combination with program instructions, a data file, a data structure, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD ROM and DVD; magneto-optical media such as floptical disks; and hardware devices that are specially configured to store and perform program instructions, such as read-only memory (ROM), random access memory (RAM), flash memory, and the like. Examples of program instructions include a machine code as produced by a compiler and an advanced language code executable by a computer using an interpreter. The hardware device may be configured to operate as at least one software module to perform the operations of example embodiments, or vice versa.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. An autonomous flight system of a drone unit for unmanned exploration and reconnaissance, the autonomous flight system comprising:

an information acquisition unit configured to acquire first information through a camera mounted to the drone unit, to acquire second information through light detection and ranging (LiDAR), and to acquire third information through an inertial measurement unit (IMU);

an information processing unit configured to estimate a pose of the drone unit through the second information and the third information, to acquire a coordinate value of a target object through the first information and the second information, and to construct a three-dimensional (3D) map and an unknown area exploration algorithm based on a pose estimation value of the drone unit, the coordinate value of the target object, and the second information;

a path planner configured to generate an obstacle avoidance path based on the 3D map and the unknown area exploration algorithm; and a flight controller configured to apply the obstacle avoidance path to the drone unit.

2. The autonomous flight system of claim 1, wherein the information acquisition unit is configured to acquire the first information related to target object recognition through the camera, to acquire the second information for pose estimation of the drone unit and map generation through the LiDAR, and to acquire the third information related to real-time angular velocity and acceleration information of the drone unit through the IMU.

3. The autonomous flight system of claim 2, wherein the information processing unit is configured to acquire the coordinate value of the target object by recognizing the target object that is a target through the first information and by computing coordinates of the target object from the first information and the second information.

4. The autonomous flight system of claim 3, wherein the information processing unit is configured to modify a target point of the drone unit by estimating the pose of the drone unit and by correcting a pose estimation error using the second information, the third information, and the 3D map.

5. The autonomous flight system of claim 4, wherein the information processing unit is configured to generate the 3D map using the coordinate value of the target object, the second information, and the pose estimation value of the drone unit, to estimate a real-time pose of the drone unit from the 3D map, the second information, and the third information, and to process the unknown area exploration algorithm with the pose estimation value.

6. The autonomous flight system of claim 5, wherein the information processing unit is configured to process the unknown area exploration algorithm that repeats a process of selecting, as an optimal frontier, a frontier furthest and having a largest cluster from among frontiers within a local horizon area and then moving thereto.

7. The autonomous flight system of claim 1, wherein the path planner is configured to generate the obstacle avoidance path by searching for a sampling-based shortest distance based on the 3D map and the unknown area exploration algorithm and by modifying a path to avoid an obstacle in a narrow area.

8. The autonomous flight system of claim 7, wherein the flight controller is configured to control a flight movement of the drone unit according to the obstacle avoidance path generated by the path planner.

9. The autonomous flight system of claim 1, wherein the information processing unit is further configured to: store a surrounding map prior to the drone unit entering an interior of a building, the surrounding map being based at least in part on the second information acquired through the LiDAR; after the drone unit leaves the interior of the building, match additional data scanned by the LiDAR against the stored surrounding map to compute a drift representing an accumulated pose estimation error of the drone unit; and modify coordinates of a target point of the drone unit by multiplying an inverse of the drift by the coordinates of the target point.

10. A drone unit for unmanned exploration and reconnaissance, the drone unit comprising:

a camera configured to acquire first information;

light detection and ranging (LiDAR) configured to acquire second information;

an inertial measurement unit (IMU) configured to acquire third information;

a memory configured to store at least one instruction; and a controller configured to execute the at least one instruction and to control a flight movement according to an obstacle avoidance path based on a three-dimensional (3D) map generated through the first information, the second information, and the third information and an unknown area exploration algorithm.

11. The drone unit of claim 10, wherein the drone unit comprises:

a drone frame;

a body provided at the center of the drone frame and equipped with the camera, the LiDAR and the IMU, the memory and the controller;

a combined propeller guard connected to the drone frame and representing a square shape based on the body;

a propeller attached downward to each of four arms of the drone frame and configured to generate thrust for flight; and a landing gear provided at a lower end of each of four corners of the drone frame and configured to couple to the combined propeller guard.

12. The drone unit of claim 11, wherein the combined propeller guard is configured to absorb shock by combining an elastic material at the center of each of four sides of the square shape.

13. An autonomous flight method by an autonomous flight system of a drone unit for unmanned exploration and reconnaissance, the autonomous flight method comprising:

acquiring first information through a camera mounted to the drone unit, acquiring second information through light detection and ranging (LiDAR), and acquiring third information through an inertial measurement unit (IMU);

estimating a pose of the drone unit through the second information and the third information, acquiring a coordinate value of a target object through the first information and the second information, and constructing a three-dimensional (3D) map and an unknown area exploration algorithm based on a pose estimation value of the drone unit, the coordinate value of the target object, and the second information;

generating an obstacle avoidance path based on the 3D map and the unknown area exploration algorithm; and applying the obstacle avoidance path to the drone unit.

14. The autonomous flight method of claim 13, wherein the acquiring comprises acquiring the first information related to target object recognition through the camera, acquiring the second information for pose estimation of the drone unit and map generation through the LiDAR, and acquiring the third information related to real-time angular velocity and acceleration information of the drone unit through the IMU.

15. The autonomous flight method of claim 14, wherein processing of the information comprises acquiring the coordinate value of the target object by recognizing the target object that is a target through the first information and by computing coordinates of the target object from the first information and the second information.

16. The autonomous flight method of claim 15, wherein the processing of the information comprises modifying a target point of the drone unit by estimating the pose of the drone unit and by correcting a pose estimation error using the second information, the third information, and the 3D map.

17. The autonomous flight method of claim 16, wherein the processing of the information comprises generating the 3D map using the coordinate value of the target object, the second information, and the pose estimation value of the drone unit, estimating a real-time pose of the drone unit from the 3D map, the second information, and the third information, and processing the unknown area exploration algorithm with the pose estimation value.

18. The autonomous flight method of claim 17, wherein the processing of the information comprises processing the unknown area exploration algorithm that repeats a process of selecting, as an optimal frontier, a frontier furthest and having a largest cluster from among frontiers within a local horizon area and then moving thereto.

19. The autonomous flight method of claim 16, further comprising: storing a surrounding map prior to the drone unit entering an interior of a building, the surrounding map being based at least in part on the second information acquired through the LiDAR; after the drone unit leaves the interior of the building, matching additional data scanned by the LiDAR against the stored surrounding map to compute a drift representing an accumulated pose estimation error of the drone unit; and modifying coordinates of a target point of the drone unit by multiplying an inverse of the drift by the coordinates of the target point.

20. The autonomous flight method of claim 16, wherein the generating of the obstacle avoidance path comprises: searching for a sampling-based shortest distance based on the 3D map and the unknown area exploration algorithm; and modifying the obstacle avoidance path by performing omnidirectional ray-casting at one or more points along the obstacle avoidance path to detect distances from obstacles in a plurality of directions and shifting the one or more points to a midpoint within a safe area defined by the detected distances.

21. The autonomous flight method of claim 13, wherein the generating of the obstacle avoidance path comprises generating the obstacle avoidance path by searching for a sampling-based shortest distance based on the 3D map and the unknown area exploration algorithm and by modifying a path to avoid an obstacle in a narrow area.

22. The autonomous flight method of claim 21, wherein the applying to the drone unit comprises controlling a flight movement of the drone unit according to the obstacle avoidance path generated by a path planner.

* * * * *